United States Patent [19]

Mosher et al.

[11] Patent Number: 5,261,740
[45] Date of Patent: Nov. 16, 1993

[54] ONE-PIECE CYLINDRICAL EXTRUDER BARREL ASSEMBLED WITH ECCENTRIC CONVERGING HOPPER FOR RECEIVING MOLTEN PLASTIC MATERIALS

[75] Inventors: Douglas E. Mosher, Oxford; Stuart A. Sardinskas, Bethany, both of Conn.

[73] Assignee: Farrel Corporation, Ansonia, Conn.

[21] Appl. No.: 711,449

[22] Filed: Jun. 6, 1991

[51] Int. Cl.⁵ .............................................. B01F 15/02
[52] U.S. Cl. ...................................... 366/76; 366/150; 425/208
[58] Field of Search ............... 366/76, 77, 79, 87, 366/96, 97, 98, 99, 150; 425/206, 208, 209

[56] References Cited

U.S. PATENT DOCUMENTS

| | | | |
|---|---|---|---|
| 2,469,999 | 5/1949 | Stober | 425/209 |
| 2,547,000 | 4/1951 | Gray | 366/87 |
| 2,947,030 | 8/1960 | Varn | 366/76 |
| 3,649,147 | 3/1972 | Fritsch | 425/206 |
| 3,998,439 | 12/1976 | Feix | 366/99 |
| 4,110,843 | 8/1978 | Skidmore | 366/76 |
| 4,143,974 | 3/1979 | Strassheimer | 366/99 |
| 4,170,446 | 10/1979 | Schutz | 366/87 |
| 4,249,877 | 2/1981 | Machen | 366/76 |
| 4,310,251 | 1/1982 | Scharer et al. | |
| 4,411,531 | 10/1983 | Holmes | 366/76 |
| 4,616,989 | 10/1986 | Mewes | 366/76 |
| 4,629,411 | 12/1986 | Bucheler | 366/87 |
| 4,718,770 | 1/1988 | Christy | 366/76 |

FOREIGN PATENT DOCUMENTS

| | | | |
|---|---|---|---|
| 1213981 | 4/1966 | Fed. Rep. of Germany | 425/209 |
| 3317058 | 7/1984 | Fed. Rep. of Germany | 366/77 |
| 7203182 | 4/1969 | Japan | 366/77 |

OTHER PUBLICATIONS

Sales Information Booklet, CP-45, "C" Series, Mar. 1982 by Farrel Machinery Group of Emhart Corp.
First Perspective Drawing, Second Perspective Drawing (in color) Capsule Specifications–Farrel Processor (CP-45), All engineering drawings, particularly 605-00026 and 605-00018, and Specification, pp. 1-9 at rear of booklet.

Primary Examiner—Harvey C. Hornsby
Assistant Examiner—Randall E. Chin
Attorney, Agent, or Firm—Parmelee, Bollinger & Bramblett

[57] ABSTRACT

A one-piece barrel for a hot-fed extruder extends from drive means at its upstream end to its discharge mouth near the downstream end of the feed screw. This one-piece extruder barrel has a split-level, in-feed opening adapted for connecting a strong, reinforcing converging hopper in close tolerance therewith for feeding molten plastic into the extruder barrel through this in-feed opening. A feed screw propels along the barrel molten plastic fed into the barrel through the in-feed opening. The barrel is a one-piece, integral, strong, cylindrical member with an axial bore whose entire length may be finish machined at one time. Such one-time finishing of the entire bore of a barrel is not possible in prior hot-fed extruder barrels, because they were built up from multiple sections assembled end-to-end to form the whole barrel. A one-piece barrel aligns more easily with the feedscrew and prevents leakage by absence of joints and is less expensive to manufacture than costly machining and time-consuming assembly of prior multiple-part, hot-fed extruder barrels. Moreover, the converging hopper is welded into a strong, integral, box-like unit with strong upstream and downstream mounting flanges. The hopper is assembled with close tolerance reinforcement fitting relationship into the relatively large in-feed opening for strengthening the barrel near this opening. This strong hopper spans across the large in-feed opening serving as a reinforcement bridge for this opening.

3 Claims, 4 Drawing Sheets

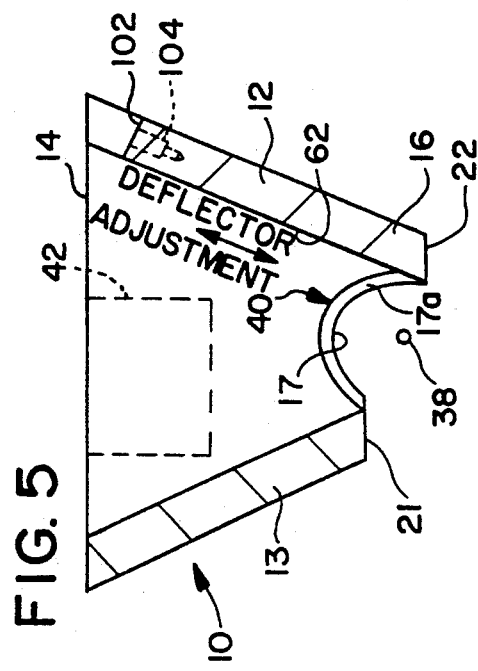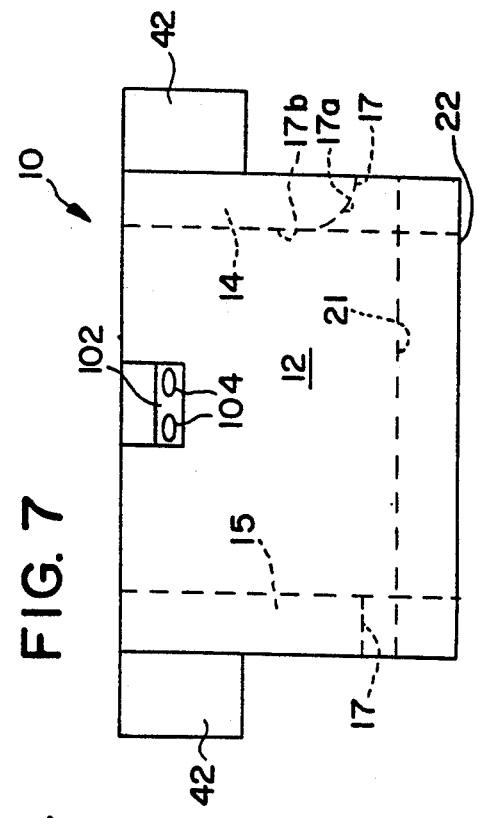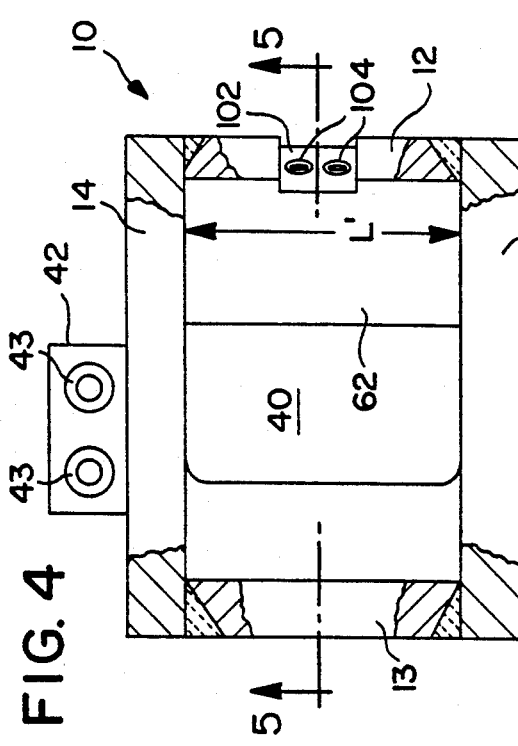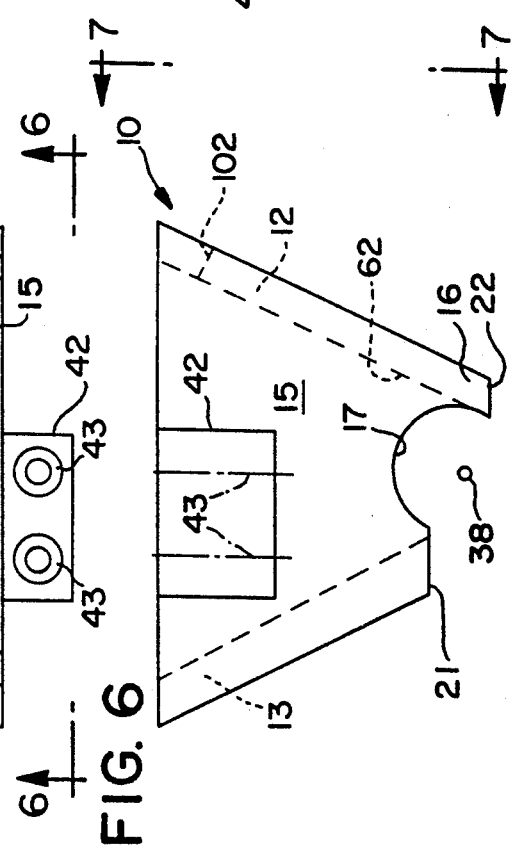

ONE-PIECE CYLINDRICAL EXTRUDER BARREL ASSEMBLED WITH ECCENTRIC CONVERGING HOPPER FOR RECEIVING MOLTEN PLASTIC MATERIALS

FIELD OF THE INVENTION

This invention is in the field of hot-fed extruders, i.e., extruders in which the plastic materials being fed into the extruder are molten. More particularly the illustrative embodiment of this invention relates to a hot-fed extruder having a one-piece integral cylindrical extruder barrel assembled with an eccentric converging hopper bridging over and serving to reinforce a split-level entrance into the extruder barrel and arranged for receiving molten plastic materials being fed into the extruder.

BACKGROUND OF THE INVENTION

Typical hot-fed extruders are made up of a feed hopper cylinder and one or more forward (downstream) cylinders or sections assembled together in axial alignment. In addition, there is often a separate drive adapter located upstream of the hopper cylinder. This drive adapter enables a reduction gear transmission unit to be coupled to the extruder barrel and to the extruder feed screw for rotating the feed screw about its axis within the barrel.

During assembly of an extruder made up of these multiple parts or sections, it is necessary to obtain a close axial alignment from piece-to-piece and also to achieve a close alignment of the whole extruder barrel assembly made up of these multiple parts so as to provide a straight bore for the extruder barrel. The reason why a close axial alignment of the extruder barrel components is necessary is that an extruder feed screw is inserted into the barrel bore along its axis. During operation of the extruder, this feed screw is rotated with its helical flights revolving closely spaced from the inner surface of the bore within the extruder barrel. A close alignment is necessary to prevent interference or gouging between the rotating feed screw and the inside surface of the extruder barrel.

Such an alignment procedure is very time consuming and costly. Many times it becomes necessary to remove one of the assembled extruder barrel sections and to have it re-machined in order to obtain the correct axial alignment for the whole assembled extruder barrel.

Moreover, there have been reports of leakage of molten plastic during operation of hot-fed extruders. The molten plastic is reported to leak out of the barrel through the joints or split lines between adjacent sections prior art of hot fed extruder barrels.

SUMMARY

It is among the objectives of the present invention to overcome or to substantially reduce these problems associated with hot-fed extruders in the prior art.

It is among further objectives of this invention to provide a new and improved hot-fed extruder barrel which is constructed from one integral section of material and is less expensive to manufacture than a multiple-part assembly.

Still another object of this invention is to provide a one-piece extruder barrel which permits one-time finish machining for completing the bore of the single-piece barrel.

Yet another object of this invention is to provide a one-piece extruder barrel which makes alignment much easier during installation of an extruder screw in the bore of the barrel.

Still another object of this invention is to provide an improved one-piece extruder barrel which eliminates leakage problems which have occurred between sections of multiple-part hot-fed extruder barrels in the prior art.

In carrying out this invention in one illustrative embodiment thereof, a one-piece extruder barrel is manufactured for use in extruding hot fed plastic materials and comprising a one-piece circular cylindrical barrel having a large entrance cut-out therein adapted to have a hopper mounted thereon for feeding plastic into the barrel through the cut-out and for reinforcing the large entrance cut-out in the wall of the barrel. A feed screw is mounted for rotation in the barrel for moving along the barrel molten plastic material fed through the cut-out.

The accompanying method comprises the steps of constructing an extruder barrel from one integral piece of metal having a single bore therein extending from end to end, cutting out an opening in the wall of the barrel for mounting the feed hopper on the barrel and machine finishing the entire single bore at one time, thereby eliminating any leakage of plastic from the bore and facilitating installing a feed screw in the bore of the one-piece barrel, thereby providing a less expensive and easier to align feedscrew and barrel assembly.

In the illustrative embodiment of the present invention the extruder barrel is formed by an integral, strong one-piece cylindrical member extending from drive means at the upstream end of the barrel to a discharge mouth at the downstream end of the extruder barrel near the downstream end of the feed screw, and an eccentric, strong, box-like converging hopper for receiving an in-feed of molten plastic material is assembled in reinforcement relationship onto the barrel spanning across a large split-level in-feed entrance cut into the wall of the extruder barrel.

Among the advantages of this one-piece, integral cylindrical extruder barrel are those resulting from the fact that the entire length of the bore of the barrel can be finish machined and completed at one time. Consequently, axial alignment of the entire bore is assured, and alignment of the axis of an inserted feed screw with the resultant straight axis of the bore of the one-piece, integral barrel becomes much easier and is less expensive to manufacture than prior art multiple-section hot-fed extruder assemblies.

Consequently, among further objects of the present invention are to reduce manufacturing, assembly and alignment costs for making barrels for hot fed extruders and to employ strong, box-like, welded converging hoppers assembled onto the barrels in a manner to reinforce the barrels at the relatively large in-feed entrances cut into the wall of the barrel as required for receiving flows of molten plastic into hot-fed extruder barrels.

BRIEF DESCRIPTION OF THE DRAWINGS

The invention, together with further objects, features, advantages and aspects thereof will be more clearly understood from the following description considered in conjunction wit the accompanying drawings which are not necessarily drawn to scale with the emphasis instead being placed upon clearly illustrating the principles of the invention. Like reference numerals indicate like elements throughout the different views.

As shown in FIG. 2 the feed entrance into the extruder barrel is eccentrically located with respect to a horizontal plane aligned with the axis of the feed screw, and one sloping side wall of the hopper is longer than the other, thus giving an overall split-level appearance to the assembly of hopper and extruder barrel as seen in FIG. 2.

FIG. 4 is a top plan view, partially in section, of only the hopper of FIGS. 1, 2 and 3, with the longer sloping side wall of the hopper being shown on the right in FIG. 4.

FIG. 5 is a cross-sectional view taken along the plane 5—5 in FIG. 4.

FIG. 6 is an end elevational view of the hopper shown in FIG. 4 as seen looking from the direction 6—6 in FIG. 4.

FIG. 7 is a side elevational view of the hopper as seen looking in the direction 7—7 in FIG. 6.

DETAILED DESCRIPTION OF THE PREFERRED EMBODIMENT

Figure 1:
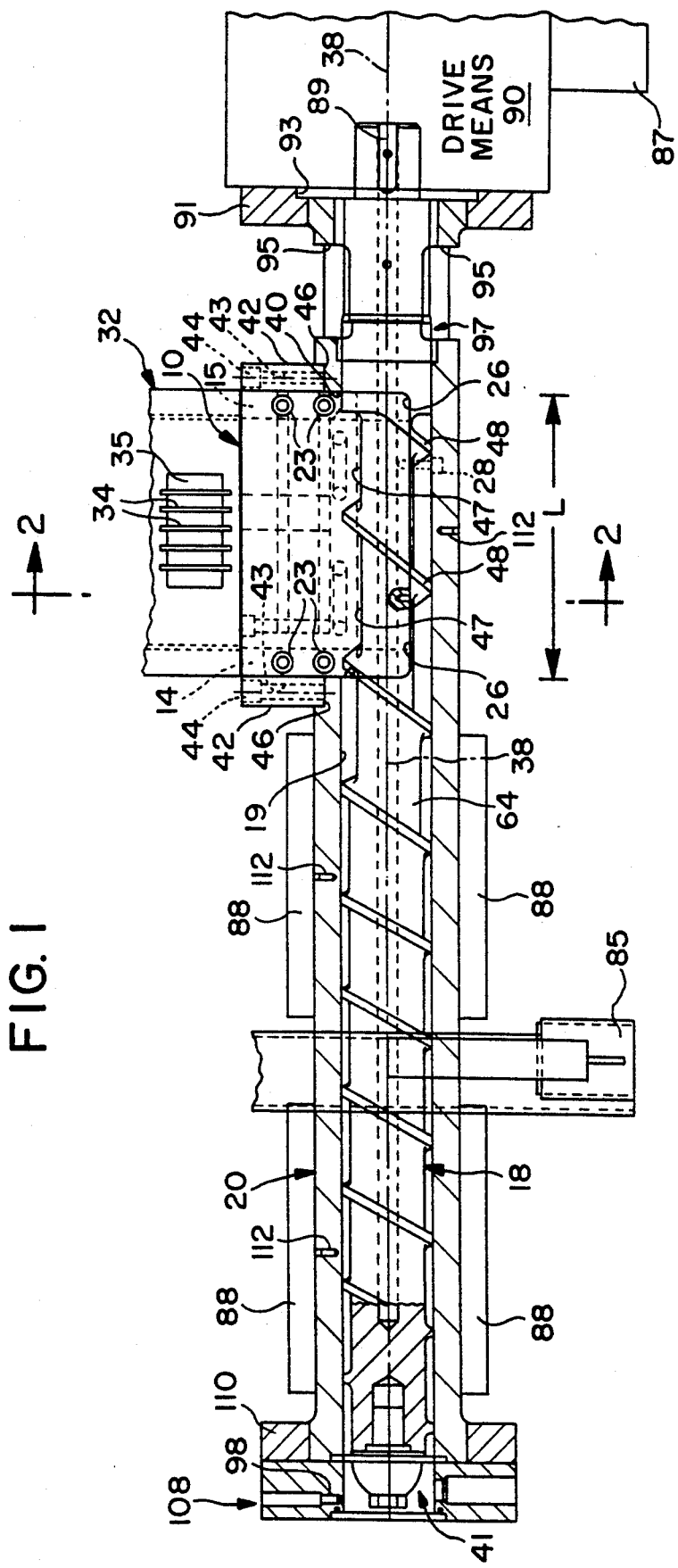
FIG. 1 is a longitudinal, sectional, elevational view of a one-piece, integral horizontal circular cylindrical hot-fed extruder barrel housing a feed screw. The extruder barrel is shown having a large, split-level feed entrance cut into the wall of the barrel for receiving molten plastic materials into the bore of the barrel, and a strong converging hopper is assembled with the large feed entrance for reinforcing the extruder barrel at the location of this large, split-level cut-out feed entrance.
Figure 2:
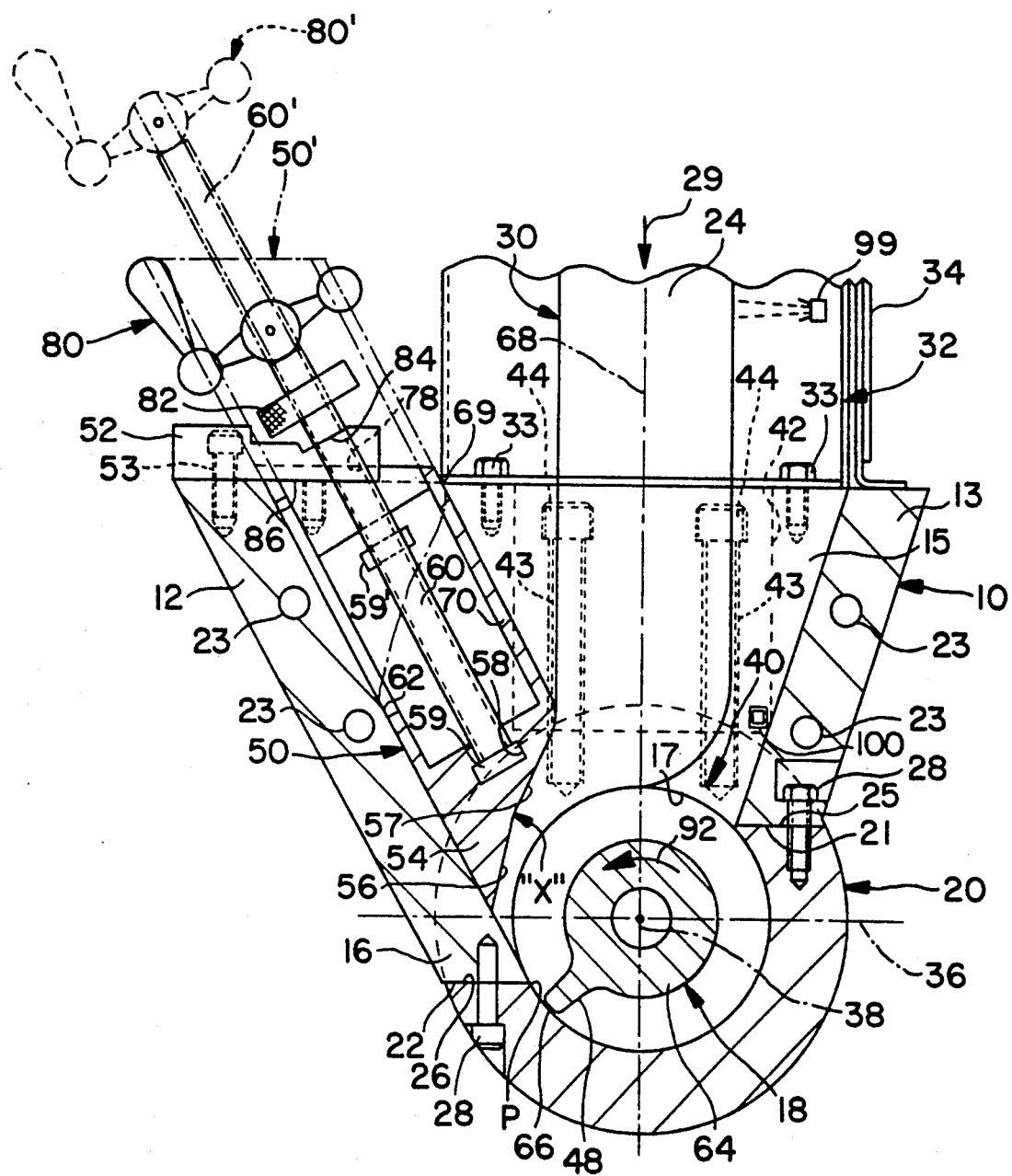
FIG. 2 is an enlarged cross-sectional, elevational view taken along the plane 2—2 in FIG. 1 looking to the right for showing how the converging hopper is assembled with the large, split-level cut-out feed entrance into the bore of the one-piece integral barrel.

Referring now to FIGS. 1 and 2, a converging extruder hopper, referred to generally by the reference numeral 10, is shown having downwardly converging side walls 12 and 13 interconnected by end walls 14 and 15 as will best be seen in FIGS. 4 through 7. The end walls 14 and 15 and side walls 12 and 13 are shown welded together to form a strong, rugged, generally rectangular box-like structure as seen in FIG. 4. This box-like hopper 10 is open at the top and bottom, with its two end walls 14 and 15 being parallel and its two sloping side walls 12 and 13 converging downwardly toward each other. The sloping wide wall 12 is considerably longer than the opposite sloping wall 13, thereby providing a downwardly projecting lower leg portion 16 (FIGS. 5 and 6). Each of the end walls 14 and 15 is cut away along an arc 17 (FIGS. 5 and 6) of circular curvature for providing clearance for a rotatable feed screw 18 (FIGS. 1 and 2) extending along the axis of a circular cylindrical extruder barrel 20 which is formed as a one-piece, integral, strong member, for example of steel. In this embodiment of the invention, these arcuate clearances 17 are aligned with the inner surface 19 of the bore of the extruder barrel 20, as shown in FIG. 2. Surface 17 and Surface 17b are orthogonal surfaces subtended by arc 17a which produces a generally conical shape between surface 17 and 17b.

In its overall appearance as seen in FIGS. 2, 5 and 6, the converging hopper 10 has a split-level configuration at the bottom. Shorter side wall 13 is terminated at its lower edge in an upper-level horizontal flat 21, while longer side wall 12 is terminated at its lower edge in a lower-level horizontal flat 22 leaving a lower level leg 16 of the wall 12 as compared with wall 13. The sloping side walls 12 and 13 of the hopper 10 are shown in FIG. 2 provided with cooling cores 23 in which cooling fluids can be circulated for controlling temperatures of flowable molten plastic material 24 to be fed into the extruder barrel 20. The split-level flats 21 and 22 of the side walls 13 and 12, respectively, of the hopper 10 are mounted with close-fitting tolerance onto mating horizontal flats 25 and 26, respectively, on the extruder barrel 20 by mounting screws 28.

The flowable plastic material 24 is moving downwardly in a rope-like form 30 as indicated by a flow arrow 29. This molten plastic 24 is coming down from a suitable source, for example such as a twin-rotor continuous mixer (not shown). In order to protect and enclose this hot, descending plastic, there is a hopper chute 32 attached by mounting screws 33 (FIG. 2) on the hopper end walls 14 and 15. The chute 32 has a protective grate 34 thereon covering a window 35 for providing visual and instrument access to the interior of the chute. Flowable plastic material 24 may comprise materials such as polymers, resins, elastomers and the like. The window 35 in the chute 32 provides not only a visual view but allows temperature readings to be made, if desired, using a radiometric device 99 such as a radiometer, pyrometer or the like.

In FIG. 2 a horizontal plane 36 is indicated by a dashed line; this horizontal plane passes through and is aligned with a longitudinal central axis 38 of the feed screw 18 shown concentric with the axis of the one-piece circular cylindrical extruder barrel 20. The mounting flats 25 and 26 on the extruder barrel 20 are located generally on diametrically opposite sides of the barrel axis 38. The mounting flat 25 is located at a higher level spaced above the horizontal plane 36 by a distance slightly greater than the radial thickness of the one-piece extruder barrel 20, while the flat 26 is located at a lower level spaced below the horizontal plane 36 by a distance slightly less than the radial thickness of the extruder barrel 20, as will be appreciated by looking closely at FIG. 2. Consequently, these substantially diametrically opposed mounting flats 25 and 26 define between themselves a relatively large wide cut-out opening in the wall of the extruder barrel 20 serving as a wide entrance 40 (FIG. 2) into the feed screw and bore of the extruder barrel.

As seen in FIG. 1, the extruder barrel 20 is formed as a one-piece, integral, strong member, for example of steel. This one-piece barrel 20 extends from drive means 90 at the upstream end of the barrel to a discharge mouth 41 at the downstream end of the extruder barrel near the downstream end of the feed screw 18. The feed entrance 40 is wide, as explained above in relation to FIG. 2. The entrance is also relatively long as seen in FIG. 1. For example, this large feed entrance 40 may have a length "L" at least equal to about 17% of the total length of the one-piece barrel 20. In this illustrative embodiment the feed entrance 40 has a length equal to about 23% of the length of the one-piece barrel. Such a large cut-out feed entrance is desired for providing sufficient pathway cross-sectional area for receiving the flow 29, 30 of hot-fed plastic material 24.

In order to assemble the hopper 10 strongly in reinforcing relationship around this large feed entrance 40, there are shown a pair of relatively large blocks 42 (FIGS. 1, 4, 6 and 7) welded onto the parallel end walls 14 and 15 for serving as strong, rugged mounting flanges. Each of these mounting blocks 42 is shown vertically drilled and countersunk at 43 (FIGS. 1 and 4) for receiving a pair of large machine screws 44 threaded into a pair of sockets in the wall of the extruder barrel 20 near each end of the feed entrance 40. For receiving these mounting blocks 42, horizontal flats 46 are shown in FIG. 1 machined on the exterior of the barrel 20 adjacent to each end of the feed entrance 40.

Consequently, the strong, rugged, welded box-like hopper 10 with its large mounting blocks 42 acts as a reinforcing bridge spanning across the top of the large cut-out entrance 40 in the one-piece barrel 20. Moreover, the close-tolerance fitting of the hopper side walls 12 and 13 down into the entrance 40 so as to seat firmly, squarely and snugly into the split-level flats 25 and 26 provides further reinforcement for the barrel wall in the vicinity of its large entrance 40.

For facilitating and aiding in feeding of either relatively stiff high viscosity plastic material 24 or relatively flexible low viscosity plastic material, including any plastic materials of intermediate viscosities, into channels 47 (FIG. 1) between flights 48 of the feed screw 18 and into the extruder barrel, there is an adjustable converging deflector 50, as seen in FIG. 2.

This adjustable converging deflector 50 in association with converging hopper 10 is an invention which is the subject of a recently-filed copending patent application assigned to the same assignee as this present patent application. In effect, this deflector 50 serves as an adjustable extension of the larger sloping wall 12. This deflector is adjustably mounted by a bracket 52 and bracket screws 53 on the hopper side wall 12 for adjustable movement upwardly and downwardly along the side wall 12 and along the lower extending leg portion 16 of this side wall 12. Such adjustment is produced by an adjusting screw 60 to be described later. The adjustable deflector 50 is terminated in a bottom wall 54 forming surface "x" which has compound-angled, deflector-shaped inclined faces 56, 57, as is seen in FIG. 2.

As shown in FIG. 2 the adjustable deflector 50 is hollow with a keyhole socket slot 58 in the bottom wall 54 for receiving and capturing a head 59 (FIG. 2) on the adjusting screw 60. The compound angle of the deflector surface "x" comprises a lower face 56 shown at an angle of about 45° to a wall line 62 and an upper face 57 shown at a larger angle of about 60° to the wall line 62. The wall line 62 is defined by the inner surface of the sloping hopper side wall 12, and the adjustable deflector 50 is slidable upwardly and downwardly along this wall line 62. Moreover, it is seen by close examination of FIG. 2, that the downward direction of this wall line 62 is tangent to the inner surface 19 of the extruder barrel 20 at point "P", and thus this wall line 62 is also substantially tangent with a circular path of travel of the revolving tip 66 of a generally helical screw flight 48 of the rotating feed screw 18. The extruder feed screw 18 is shown with a shank or root 64 shown with an axial bore, and the generally helical screw flight 48 has its tip 66 revolving around axis 38 closely spaced from the inner surface 19 of the one-piece extruder barrel 20.

The adjusting screw 60 is threaded through a screw hole 78 in bracket 52 and is shown in FIG. 2 operated by a hand crank 80. A multi-lobed lock nut or thumb wheel 82 is mounted on the adjustment screw 60 and can be seated against a diagonal seat 84 in the mounting bracket 52 for locking the adjusting screw 60 in any desired adjusted position. When an adjustment is to be made, the locking wheel 82 is loosened; the hand crank 80 is operated for moving the adjustable deflector 50 along the side wall 12; and then the wheel 82 is again locked for holding the new adjusted position.

In FIG. 2, the adjustable deflector 50 is shown in cross section in a lowered position with respect to the extruder screw 18. Also, there is an elevated dashed and dotted outline 50' of the deflector for indicating its most elevated position, and hand crank 80' is illustrated in its most elevated position, thereby showing a wide range of adjustments provided for the adjustable deflector 50. A stop 86 is shown for limiting upward travel of the deflector 50.

The hopper chute 32 is symmetrically positioned vertically above the axis 38 of the feed screw 18 and extruder barrel 20, such that the vertical centerline 68 of the chute is directly aligned with the axis 38. The shorter sloping side wall 13 is shown inclined inwardly downwardly at an angle of about 18° to 20° relative to the vertical centerline 68, while the longer sloping side wall 12 is show inclined inwardly downwardly at a larger angle of about 30°. By virtue of this split-level eccentric orientation of the hopper 10, there is sufficient clearance for operation of the deflector 50 in the region between the sloping wall line 62 and the lower end of the chute 32 at 69 (FIG. 2). Thus, deflector 50 has sufficient clearance to be adjustable upwardly and downwardly over a wide range of travel along the wall line 62 and also enough clearance to be completely withdrawn and replaced by another deflector having a multi-faced surface X of different configuration, when desired.

In FIG. 1 the one-piece, integral extruder barrel 20 is shown mounted on a support 85 with another support being shown at 87, and the barrel is shown surrounded by heating and cooling means 88. Drive means 90 mounted on support 87 are keyed at 89 to the feedscrew 18 for rotating it about axis 38.

Figure 3:
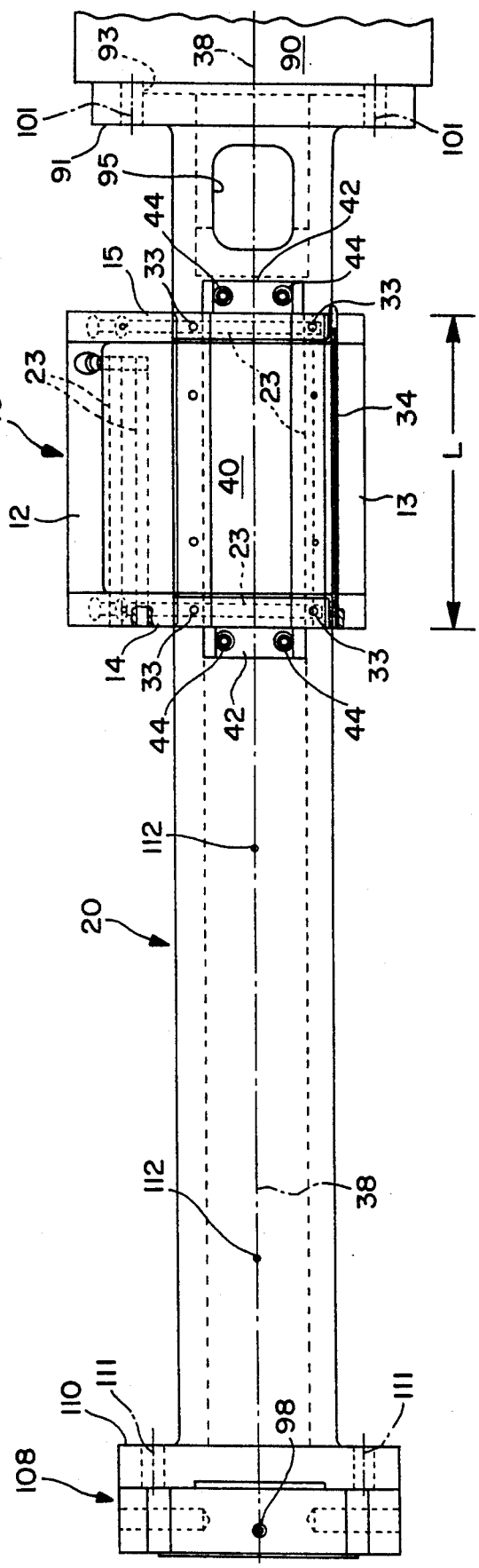
FIG. 3 is a top plan view of the one-piece cylindrical extruder barrel assembled with the box-like converging hopper. The manually adjustable converging deflector seen in FIG. 2 is omitted from FIG. 3 for clarity of illustration. Also, heating and cooling means shown in FIG. 2 surrounding the barrel are omitted from FIG. 3 for clarity of illustration of the one-piece barrel and hopper assembly.

In order to secure the upstream end of the one-piece barrel 20 to the drive means 90 for withstanding relative large torque loading, a large flange 91 (FIG. 1) is shown welded to this upstream end, for removable attachment by machine screws 101 (FIG. 3) or the like to drive means 90. This flange 91 defines an alignment socket 93 which fits onto an axial projection of the housing of drive means 90 concentric with its rotation drive axis 38 for aligning the axis of bore 19 with the rotation drive axis. There are upper and lower access openings 95 in the barrel wall near the upstream flange 91 for providing access for servicing a packing gland assembly 97 located upstream from the in-feed opening 40 for preventing upstream migration of plastic materials. These access openings 95 also help to dissipate heat so as to provide some thermal isolation for drive means 90.

At the downstream end of the barrel 20 is the discharge mouth 41 (FIG. 1) of the bore 19 which is located near the downstream end of feed screw 18. Suitable attachment means are provided at this downstream end of the barrel for fastening a head assembly 108 onto which an extrusion device (not shown) can be mounted. In this example, the attachment means for the head assembly 108 comprises a flange 110 welded to the downstream end of the barrel 20. This flange 110 has a plurality of holes (not shown) for removable attachment by machine screws 111 (FIG. 3) or the like to the head assembly 108.

For sensing temperatures of the metal of the barrel wall, there are shown a plurality of temperature sensing ports 112 (FIG. 1). Two temperature sensing ports are shown located at spaced intervals along the top of the barrel and one in the barrel wall below the in-feed entrance 40.

In operation, the converging hopper 10 is optimized in performance by adjusting upwardly or downwardly the deflector 50 which functions to be adaptable for effectively guiding and deflecting different types of plastic, whether relatively rigid or relatively flexible, or of intermediate viscosities, into the extruder barrel 20. As flowable plastic material 24 descends into the hopper 10, this molten material is directed against the compound-angle surface X of the adjustable deflector 50 as the flights 48 of the extruder screw 18 turn into the plastic material as shown by a screw rotation arrow 92.

In order to provide sensor data to a process controller (not shown), there may be transducers 98 (FIG. 1) and 99 (FIG. 2) for sensing pressure and temperature, respectively, and a level indicator sensor 100, for example a photocell, for sensing configuration or level of the plastic mass flow 29, 30.

Further modifications which may be made in the hopper will now be discussed. In FIG. 2, the bracket 52 is shown mounted horizontally on the top of the hopper 10; it has a diagonal seat 84 for the locking thumb wheel 82; and there is a diagonal screw hole 78 for receiving the adjusting screw 60. FIGS. 4 through 7 show a notch 102 with its bottom surface perpendicular to the wall line 62 of the longer sloping side wall 12. It will be understood that a modified bracket mounted in this notch 102 with screws engaged in screw holes 104 will be oriented perpendicular to the axis of the adjusting screw 60 (FIG. 2) such that the diagonal seat 84 can be omitted and the axis of the screw hole 78 can be oriented conveniently perpendicular to the length of such modified bracket.

Since other changes and modifications varied to fit particular operating requirements and environments will be recognized by those skilled in the art, the invention is not considered limited to the examples chosen for purposes of illustration and includes all changes and modifications which do not constitute a departure from the true spirit and scope of this invention as claimed in the following claims and equivalents thereto.

We claim:

1. A one-piece extruder barrel for a hot-fed extruder, said one-piece barrel comprising:
    an elongated integral cylindrical barrel having an upstream end and a downstream end;
    said elongated barrel having a bore therein with a straight axis;
    said bore extending from the upstream end of said barrel to its downstream end for receiving in the bore a rotatable feed screw having its axis of rotation extending along the bore;
    drive means for rotating a feed screw in the bore;
    said elongated barrel having first attachment means at its upstream end for attaching to said drive means;
    said elongated barrel having second attachment means at its downstream end;
    said elongated barrel having a feed entrance formed therein leading into the bore for receiving molten plastic materials fed into said entrance toward a feedscrew rotating in the bore;
    said feed entrance having upstream and downstream ends and having a length "L" between said upstream and downstream ends of said feed entrance which is at least about 17% of the total length of said elongated barrel;
    a hopper being secured to said elongated barrel upstream and downstream of said feed entrance;
    said hopper spanning across said feed entrance;
    said hopper having first and second parallel vertical end walls;
    said hopper having first and second side walls downwardly converging toward each other;
    said first and second end walls and said first and second side walls being secured together for forming a rigid, box-like structure;
    said first and second end walls extending down into said feed entrance closely adjacent to downstream and upstream ends, respectively, of said feed entrance;
    said first and second end walls having bottom surfaces shaped for substantial conformity with the inner surface of said bore adjacent to said first and second end walls, respectively;
    said first and second end walls having first and second flange means rigidly secured thereto, respectively, exterior of said box-like hopper structure;
    removably connection means connecting said first and second flange means to said elongated barrel near said upstream and downstream ends, respectively, of said feed entrance;
    said removable connection means connecting said first and second flange means to said elongated barrel adjacent to said upstream and downstream ends of said feed entrance;
    said elongated barrel having a pair of flats thereon adjacent to said upstream and downstream ends of said feed entrance; respectively; and
    said first and second flange means having a flat-bottom mounting surface for seating onto said pair of flats, respectively.

2. A one-piece extruder barrel for a hot-fed extruder as claimed in claim 1, in which:
    said elongated, integral, cylindrical barrel is defined by a barrel wall encircling said bore, and said barrel wall has an inner surface defining said bore and said barrel wall has an outer surface;
    said feed entrance is formed by a cut-out in said wall of said elongated, integral, cylindrical barrel;
    said cut-out has first and second margins each extending parallel with the straight axis of the bore and being located on opposite sides of said straight axis;
    said first margin of said cut-out extends completely through said barrel wall from said outer surface to said inner surface;
    said second margin of said cut-out extends completely through said barrel wall from said outer surface to said inner surface;
    said first margin of the cut-out is located at a level above a horizontal plane passing through said straight axis of the bore parallel with said straight axis; and
    said second margin of the cut-out is located at a level below said horizontal plane.

3. A one-piece extruder barrel as claimed in claim 1, in which:

said first and second margins of said cut-out feed entrance are horizontally flat, thereby providing a split-level configuration as seen in a cross section taken through said margins perpendicular to said axis and looking at said cross section in a direction parallel with said axis; and said first and second side walls have first and second lower edges, respectively;

said first and second lower edges are horizontally flat as seen in said cross section; and said first and second lower edges are mounted on top of and are fastened to said second and first margins, respectively, of the feed entrance.

* * * * *